June 6, 1961 R. DESCARRIES 2,986,756
SPLASH GUARD FOR DOMESTIC APPLIANCE
Filed July 12, 1957 2 Sheets-Sheet 1
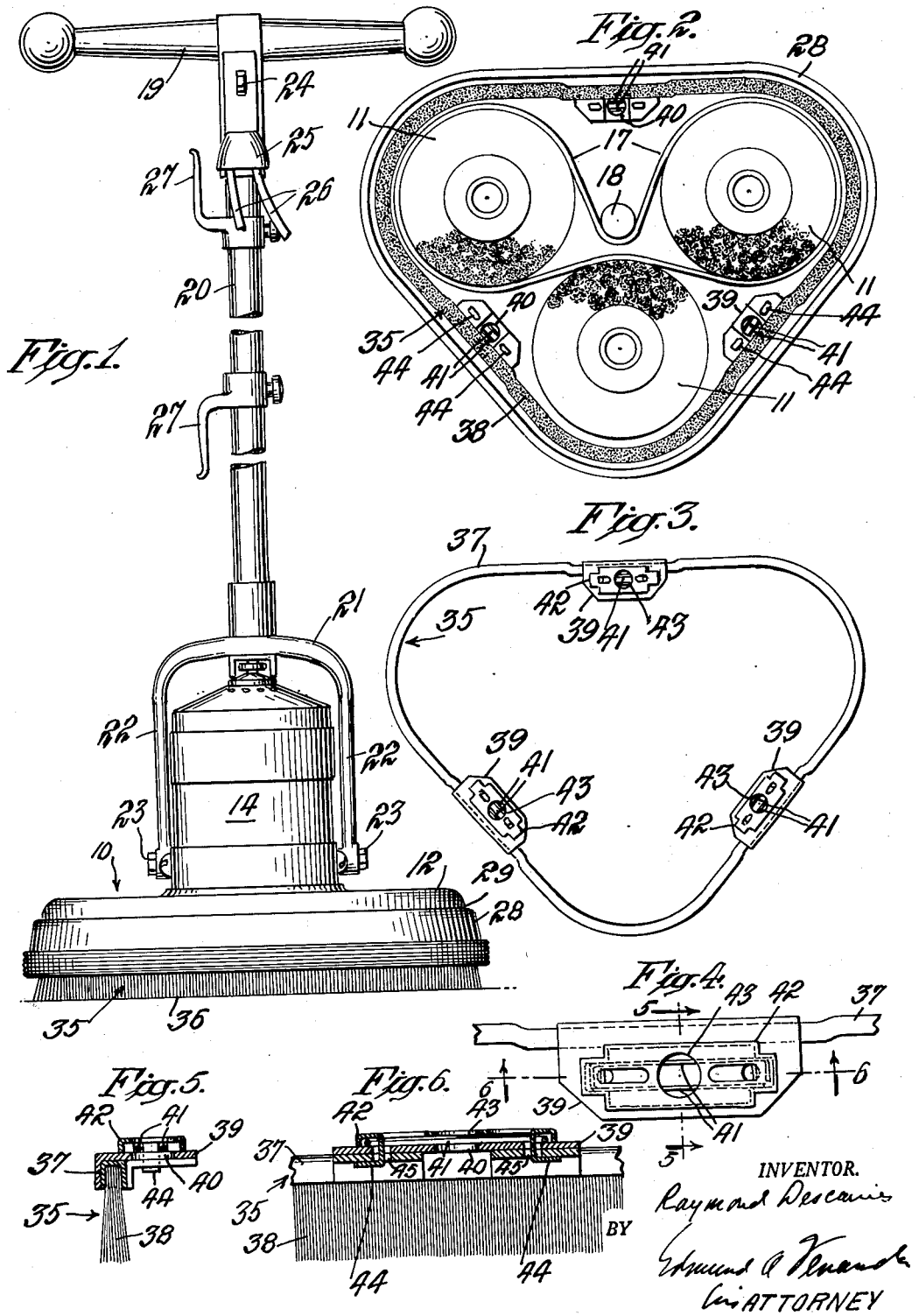
INVENTOR.
Raymond Descarries
BY
ATTORNEY June 6, 1961  R. DESCARRIES  2,986,756
SPLASH GUARD FOR DOMESTIC APPLIANCE
Filed July 12, 1957  2 Sheets-Sheet 2
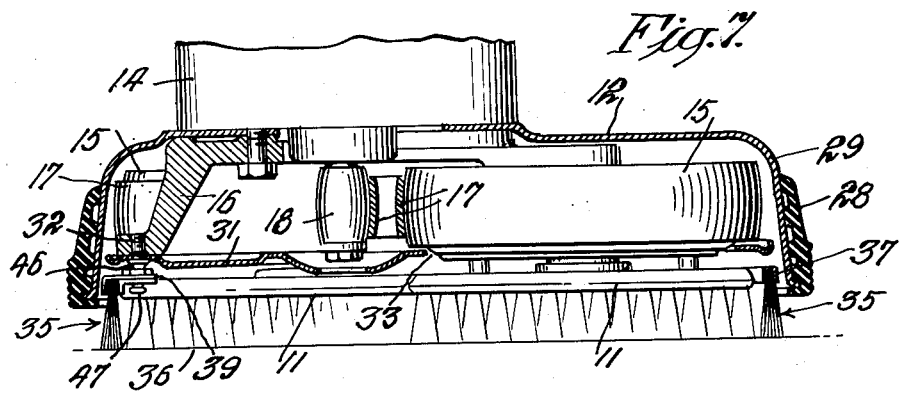
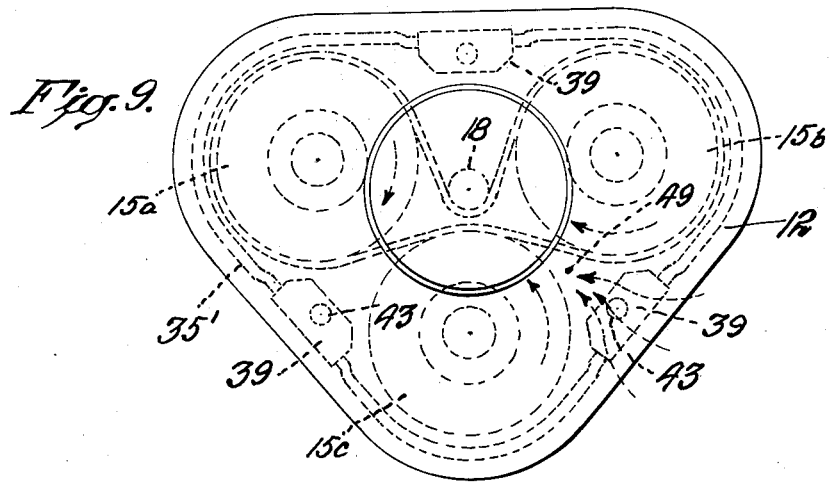
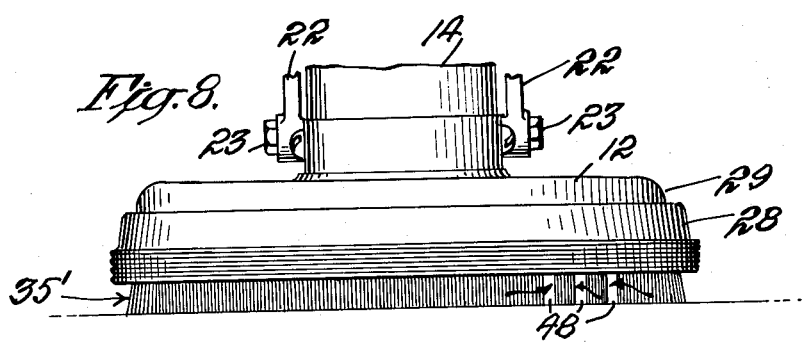
INVENTOR.
Raymond Descarries
BY
his ATTORNEY

United States Patent Office 2,986,756
Patented June 6, 1961

2,986,756
SPLASH GUARD FOR DOMESTIC APPLIANCE
Raymond Descarries, Montreal, Quebec, Canada, assignor to Aktiebolaget Electrolux, Stockholm, Sweden, a corporation of Sweden
Filed July 12, 1957, Ser. No. 671,517
Claims priority, application Canada July 20, 1956
5 Claims. (Cl. 15—49)

My invention relates to domestic appliances having a motor-driven rotatable member for treating floors with the aid of a suitable agent in liquid or paste form, such as washing liquid or liquid or paste wax, for example, and has for its object the provision of a suitable device for preventing splashing and scattering of the treating agent due to the centrifugal action of the rotatable member.

Further objects and advantages of my invention will become apparent as the following description proceeds, and the features of novelty which characterize my invention will be pointed out with particularity in the claims annexed to and forming a part of this specification.

For a better understanding of my invention, reference may be had to the following description taken in connection with the accompanying drawing, in which FIG. 1 is a front elevation, partly in section, of a floor treating machine embodying the invention, the upright rod associated with the handle being broken away and foreshortened; FIG. 2 is a bottom plan view of the base of the floor treating machine shown in FIG. 1; FIG. 3 is a top plan view of a part of the floor treating machine shown in FIGS. 1 and 2; FIG. 4 is an enlarged fragmentary view of details shown in FIG. 3; FIGS. 5 and 6 are sectional views taken at lines 5—5 and 6—6, respectively, of FIG. 4; FIG. 7 is an enlarged vertical sectional view of parts shown in FIGS. 1 and 2; FIG. 8 is a fragmentary front elevation of a floor treating machine like that shown in FIG. 1 illustrating a modification of the invention; and FIG. 9 is a top plan view of the base of the floor treating machine shown in FIG. 8, the operating handle being omitted, and the three disks thereof, together with the driving belt for the disks, being shown in dotted lines.

Referring to the drawing, I have shown my invention applied to a floor treating machine 10 having rotatable brushes 11 which project downwardly beneath a hood or base 12 and are arranged to be driven by an electric motor (not shown) housed in an upright casing 14 positioned over an opening in the hood. By way of example, the brushes 11 may be detachably secured in any suitable manner to disks 15 which are rotatable on shafts journaled in a frame 16 at the underside of the base 12 and driven by an endless belt 17. The belt 17, which may be formed of rubber or other suitable resilient material, is under tension and passes over the disks 15 and a driving pulley 18 which is fixed to the lower end of the motor shaft.

The floor treating machine 10 is adapted to be manipulated by a handle 19 connected to the upper end of a rod 20 whose lower end is connected to the closed end of an inverted U-shaped yoke or fork 21 having spaced apart arms 22, the lower ends of which are pivoted at 23 to the casing 14. Upon the rod 20 is mounted a switch 24 adapted to receive electrical conductors 26 each having two wires insulated from one another. Although not shown, one of the conductors is adapted to extend downwardly to the casing 14 for connection at its lower end to the electric motor housed therein. The other conductor desirably is of considerable length and adapted to be connected to a source of electrical supply. A pair of spaced apart hook-like elements 27 are provided on the rod 20 so that the conductor normally connected to the source of electrical supply may be looped about the elements 27 when the floor treating machine is not in use.

The hood or base 12, which is of triangular shape, is provided with an annular member 28 of resilient material like rubber, for example, to prevent injury to the floor treating machine itself and to furniture and wall baseboards which accidentally may be contacted by the machine while it is being manipulated over a floor to be treated. As shown, the annular member 28 may be yieldingly held in place about a downwardly depending skirt 29 of the hood or base 12.

The floor treating machine 10 may be employed for washing, waxing, polishing and buffing floors. When the machine 10 is employed for washing floors, it is desirable to employ brushes having relatively stiff bristles. For spreading liquid or paste wax on a floor, the brushes, though desirably hard, are not as stiff as those employed for a washing operation.

As best shown in FIG. 7, the base 12 is provided with a bottom plate 31 removably secured by screws 32 to the frame 16 and formed with openings 33 to facilitate the attachment of the brushes 11 to the disks 15 and an opening 34 at the bottom of the motor shaft. Hence, when the machine 10 is being employed to treat a floor with a substance in liquid or paste form, the bottom plate 31 effectively prevents any liquid passing upwardly into the motor housing 14. This is so because the brushes 11 and pulley 18 are closely adjacent to the bottom plate 31 at the regions of the openings therein and contribute to providing a substantially liquid-tight compartment or space in the hood 12 above the plate 31.

When the floor treating machine 10 is employed to treat a floor with a substance in liquid or paste form, the action of the rotating brushes may often splatter the substance on furniture and walls. Therefore, in order that the floor treating machine 10 can be freely manipulated about a floor without danger of the substance being applied to the floor being splashed or scattered, I provide a guard or shroud 35 which is of annular form and encircles the brushes 11 and moves over the floor 36 while the machine is being manipulated. In the preferred embodiment illustrated, the guard is of triangular form and is detachably connected to the underside of the base 12, the connection being effected in such a manner that the guard 35 can move up and down freely as it moves about the floor with the base 12 during manipulation of the machine 10, the guard being held in intimate contact with the floor only by its dead weight.

The guard 35 comprises a brush having a metal backbone 37 which is of inverted U-shape in section and to which are fixed bristles 38, as best shown in FIG. 5. At an intermediate region of each side of the splash guard 35 is provided an inwardly extending lug or ledge 39 having a centrally disposed opening 40 over which a pair of spaced apart wires 41 are positioned. The wires 41 extend lengthwise of the ledges 39 and are held in rectangular-shaped fittings 42 having openings 43 in vertical alignment with the ledge openings 40, the fittings being provided with tabs 44 which pass downwardly through end openings 45 in the ledges and are bent to fasten the fittings to the ledges, as best shown in FIGS. 4, 5 and 6.

The spaced apart wires 41 held in place immediately above the ledge openings 40 serve as resilient clips in the form of apertured elements for detachably connecting the splash guard 35 to the underside of the base 12. As shown in FIG. 7, the screws 32 for holding the plate 31 in position may be formed with conical-shaped heads 46 having enlarged portions 47 at their smaller ends which are laterally spaced from the periphery of the skirt 29. When the splash guard 35 is detachably connected to the underside of the base 12, the guard is initially positioned with each apertured element or pair of wires 41 of each spring clip bearing against the enlarged portion 47 of one of the screw heads 46 of an elongated element, after which the guard can be pressed toward the bottom plate 31 to cause each pair of wires 41 to spread apart to allow the enlarged end portions 47 to pass therethrough. With this arrangement, the shroud or splash guard 35 can be easily detached from the underside of the base 12 without the use of tools. The ledges 39 are thus connected to the elongated elements or conical-shaped screw heads 46 and are vertically movable thereon between their wider parts adjacent the plate 31 and the enlarged portions 47 at the opposite smaller ends thereof.

When the machine 10 is being used to wash a floor with a soapy liquid, the gaps which are formed between the floor and the bottom edge of the splash guard 35 as the shroud or guard is moving over the floor provide a passage for the liquid to pass into the inside of the guard. Further, the guard 35 effectively prevents scattering or splashing of the liquid by the rotating brushes. In effect, the shroud or guard serves as a fence which not only prevents splashing and scattering of the liquid from the regions of the brushes, but also keeps it confined to the immediate vicinities of the brushes, which results in a floor being washed and cleaned more effectively. This is so because, when no guard is employed, the brushes tend to push the washing liquid away from the immediate area they are influencing, which reduces materially the quantity of washing liquid being acted upon by the brushes so that sometimes the brushes may be rotating on areas which are only wet and have no washing liquid on them.

Since most floors are not perfectly even due to surface irregularities, I have found that a shroud or splash guard brush having an essentially straight bottom edge will allow washing liquid to pass into the inside of the guard through the gaps formed between the floor and the bottom edge of the brush as it moves over a floor. By way of example and without limitation, I have found that when the bristles of brush 38 form a wall thickness in the neighborhood of ⅛ to 3/16 of an inch in depth at the region they engage the floor, the brush effectively serves as a splash guard and liquid also passes to the inside thereof during movement of the machine over the floor.

To promote the movement of washing liquid to the inside of the guard underneath the bottom edge thereof, another embodiment is illustrated in FIGS. 8 and 9, where the guard 35' is shown notched at its bottom edge at 48. It will be seen in the modification of FIGS. 8 and 9 that the disk 15b is being driven in a clockwise direction while the disk 15c is being driven in a counter-clockwise direction. Hence, when washing liquid on a floor passes through the notches 48 into the region 49 between the brushes attached to the disks 15b and 15c, the washing liquid will be contacted by the brushes at those points in their paths of rotation where the centrifugal forces they produce will cause the washing liquid to be thrown from the region 49 toward the center of the machine at the vicinity of the pulley 18. Hence, the notches 48 are provided in the shroud 35' at the immediate vicinity of a vertical plane which is perpendicular to another vertical plane passing through the axes of rotation of the disks 15b and 15c and at a zone where the paths of rotation of the disks 15b and 15c move toward one another.

Another way of promoting the movement of washing liquid to the inside of the guard underneath the bottom edge thereof is to provide a brush 38 at certain regions of which the bristles are shorter than at other regions, which will create gaps between the bristles and the floor.

Hence, even though the guard 35, is provided with the notches 48, the brushes attached to the disks 15b and 15c will tend during their rotation to cause liquid entering the region 49 through the notches to be thrown toward the center of the machine rather than to be thrown outwardly. Since the brushes attached to the disks 15a and 15b are farther apart than the brushes attached to the disks 15b and 15c and those attached to the disks 15a and 15c, to position the guard 35' on the base 12, the notches 48 will always have to be opposite the region 49.

In view of the fact that the floor treating machine 10 shown and described above is of triangular form, it will be apparent that it can be readily moved into corner areas, thereby making it possible to treat all parts of a floor effectively. By providing the splash guards 35 and 35' as described above and illustrated in the drawing, the corner regions of a floor can be washed or treated with any substance in liquid or paste form without danger of the liquid or paste being splattered on walls.

While I have shown and described particular embodiments of the invention, it will be apparent to those skilled in the art that various modifications and changes may be made without departing from the spirit and scope of the invention as pointed out in the following claims.

What is claimed is:

1. In a floor treating appliance comprising a base having a downwardly extending skirt about its periphery, motor-driven rotatable means at the underside of said base which is movable over a surface to be treated, a vertically disposed shroud of annular form, and means for fastening the shroud to said base at spaced regions at the underside thereof which are laterally spaced from the periphery of said skirt to position the shroud within and spaced from said skirt and about said rotatable means, said last-mentioned fastening means comprising a plurality of pairs of cooperating elements fixed to the shroud and the underside of said base, respectively, each pair of elements including an apertured element and an elongated element which is normally vertically disposed and extends through the apertured element, the elongated and apertured elements embodying structure for detachably connecting the shroud to the underside of said base when the elongated elements project through the apertured elements and for effecting separation of the elongated and apertured elements without the use of tools to remove the shroud from the underside of said base, and the last-mentioned structure embodied in the elongated and apertured elements including provisions whereby the shroud is readily movable vertically with respect to said base at each of said fastening regions when moved over the surface with the rotatable means and in intimate physical contact with the surface.

2. Apparatus as set forth in claim 1 in which the structure embodied in the elongated and apertured elements for detachably connecting the shroud to the underside of said base further includes provisions whereby the shroud is held in intimate physical contact with the surface only by its dead weight.

3. Apparatus as set forth in claim 1 in which the apertured elements of said fastening means are resilient in character for detachably connecting the shroud to said base.

4. Apparatus as set forth in claim 3 in which the elongated elements and apertured elements provide a loose connection at each of said fastening regions between the shroud and said base.

5. Apparatus as set forth in claim 1 in which said motor-driven rotatable means includes at least a pair of spaced apart members mounted for rotation about vertical axes and means for rotating said members in opposite directions, the shroud completely encircling both of said rotatable members and essentially forming an enclosure about the latter, the edge of the shroud being normally in intimate contact with the surface to be treated and being apertured only at the immediate vicinity of a vertical plane which is perpendicular to another vertical plane passing through the vertical axes of rotation of said members and at a zone where the paths of rotation of said rotatable members move toward one another.

References Cited in the file of this patent

UNITED STATES PATENTS 2,220,224    Faber _____ Nov. 5, 1940

FOREIGN PATENTS 43,495    Denmark _____ Dec. 4, 1930
124,497    Switzerland _____ Mar. 16, 1928
484,774    Italy _____ Sept. 18, 1953
587,236    Germany _____ Nov. 1, 1933
716,035    Germany _____ Jan. 12, 1942
860,549    France _____ Sept. 30, 1940